United States Patent
Liu et al.

(10) Patent No.: US 12,435,007 B2
(45) Date of Patent: Oct. 7, 2025

(54) NEAR-INFRARED PHOTOTHERMAL COUPLING CURING NON-OXIDE CERAMIC SLURRY AND ITS PREPARATION METHOD AND APPLICATION

(71) Applicant: JIANGNAN UNIVERSITY, Wuxi (CN)

(72) Inventors: Ren Liu, Wuxi (CN); Xinxin Sang, Wuxi (CN); Yongqin Zhao, Wuxi (CN); Jiatao Miao, Wuxi (CN)

(73) Assignee: JIANGNAN UNIVERSITY, Wuxi (CN)

(*) Notice: Subject to any disclaimer, the term of this patent is extended or adjusted under 35 U.S.C. 154(b) by 162 days.

(21) Appl. No.: 18/362,361

(22) Filed: Jul. 31, 2023

(65) Prior Publication Data
US 2024/0132410 A1   Apr. 25, 2024
US 2024/0228385 A9   Jul. 11, 2024

(30) Foreign Application Priority Data

Oct. 21, 2022 (CN) .......................... 202211293850.6

(51) Int. Cl.
*C04B 35/565* (2006.01)
*B28B 1/00* (2006.01)
(Continued)

(52) U.S. Cl.
CPC ............ *C04B 35/565* (2013.01); *B28B 1/001* (2013.01); *B33Y 10/00* (2014.12); *B33Y 70/00* (2014.12);
(Continued)

(58) Field of Classification Search
CPC ................ C04B 35/565; C04B 35/587; C04B 35/62625; C04B 35/6269;
(Continued)

(56) References Cited

U.S. PATENT DOCUMENTS

| | | | |
|---|---|---|---|
| 11,945,754 B2* | 4/2024 | Lu | C04B 35/6269 |
| 2020/0290931 A1* | 9/2020 | Eckel | C04B 35/571 |
| 2020/0339481 A1* | 10/2020 | Hampden-Smith | C04B 35/5626 |

OTHER PUBLICATIONS

First Office Action and Search Report issued in Chinese Patent Application No. 202211293850.6; mailed Feb. 15, 2023; 12 pgs.

* cited by examiner

*Primary Examiner* — Nahida Sultana
(74) *Attorney, Agent, or Firm* — HAUPTMAN HAM, LLP

(57) ABSTRACT

The invention presents a near-infrared photothermal coupling curing non-oxide ceramic slurry, along with its preparation method and application. The ceramic slurry consists of various raw materials, with weight fractions as follows: non-oxide ceramic powder (40~90 parts), photosensitive resin (0.5~20 parts), photosensitive monomer (1~40 parts), photoinitiator (0.25~4 parts), thermal initiator (0.25~4 parts), additive (0.75~5 parts), and up-conversion luminescent material (0.5~4 parts). The non-oxide ceramic powders can include $Si_3N_4$, TiN, BN, AlN, SiC, WC, TiC, ZrC, $TiB_2$, and $ZrB_2$. By combining the photochemical and photothermal dual curing system using near-infrared up-conversion, this invention addresses the issue of insufficient curing encountered in single photocuring or thermal curing processes. Moreover, by incorporating near-infrared light source-driven additive manufacturing, it enables rapid prototyping of high-solid-content non-oxide ceramic slurry, ultimately allowing for the fabrication of high-fidelity non-oxide ceramic structures.

8 Claims, 2 Drawing Sheets

(51) Int. Cl.
   *B33Y 10/00*      (2015.01)
   *B33Y 70/00*      (2020.01)
   *C04B 35/587*     (2006.01)
   *C04B 35/626*     (2006.01)
   *C04B 35/634*     (2006.01)
   *C04B 35/638*     (2006.01)
   *C04B 35/64*      (2006.01)
   *C09K 11/02*      (2006.01)
   *C09K 11/77*      (2006.01)

(52) U.S. Cl.
   CPC ...... *C04B 35/587* (2013.01); *C04B 35/62625* (2013.01); *C04B 35/6269* (2013.01); *C04B 35/63424* (2013.01); *C04B 35/638* (2013.01); *C04B 35/64* (2013.01); *C09K 11/025* (2013.01); *C09K 11/7773* (2013.01); *C04B 2235/3826* (2013.01); *C04B 2235/3873* (2013.01); *C04B 2235/445* (2013.01); *C04B 2235/5445* (2013.01); *C04B 2235/6026* (2013.01); *C04B 2235/606* (2013.01); *C04B 2235/9646* (2013.01)

(58) Field of Classification Search
   CPC . C04B 35/63424; C04B 35/638; C04B 35/64; C04B 2235/3826; C04B 2235/3873; C04B 2235/445; C04B 2235/5445; C04B 2235/6026; C04B 2235/606; C04B 2235/9646; C04B 2235/3201; C04B 2235/3203; C04B 2235/3215; C04B 2235/3224; C04B 2235/3225; C04B 2235/6025; C04B 2235/6562; C04B 2235/6567; C04B 2235/96; C04B 35/5611; C04B 35/5618; C04B 35/5626; C04B 35/58071; C04B 35/58078; C04B 35/581; C04B 35/583; C04B 35/584; C04B 35/6263; C04B 35/63452; C04B 35/645; C04B 35/62605; C04B 35/622; C04B 35/634; C04B 2235/5436; B28B 1/001; B33Y 10/00; B33Y 70/00; B33Y 70/10; C09K 11/025; C09K 11/7773; Y02P 10/25
   See application file for complete search history.

NEAR-INFRARED PHOTOTHERMAL COUPLING CURING NON-OXIDE CERAMIC SLURRY AND ITS PREPARATION METHOD AND APPLICATION

RELATED APPLICATIONS

The present application claims priority from Chinese Application Number 202211293850.6, filed Oct. 21, 2022, the disclosure of which is hereby incorporated by reference herein in its entirety.

BACKGROUND OF THE INVENTION

1. Technical Field

The present invention is in the field of ceramic additive manufacturing technology, specifically focusing on a near-infrared photothermal coupling curing non-oxide ceramic slurry and its associated preparation method and application.

2. Description of Related Art

Non-oxide ceramics possess excellent mechanical properties at both room temperature, such as high bending strength, good corrosion resistance, high wear resistance, and low friction coefficient, as well as at high temperatures, including strength and creep resistance. These properties make non-oxide ceramics highly suitable for various industrial fields, including petroleum, chemical, microelectronics, automotive, aviation, aerospace, and more. Despite their superior performance compared to oxide ceramics, non-oxide ceramics face challenges in sintering and lightweight processing, which hinder their development and application.

3D printing, as a rapid prototyping technology, offers a potential solution to address the weight reduction challenges in ceramics. While 3D printing of oxide ceramics like alumina and zirconia has been widely adopted in aerospace, biomedical, and other fields, there has been limited research on additive manufacturing of non-oxide ceramics. Photocuring technology, as an efficient and eco-friendly method, offers advantages such as rapid curing, environmental compatibility, and low energy consumption, making it increasingly popular across various industries. However, non-oxide ceramics such as silicon carbide and silicon nitride pose challenges in photocuring due to their high refractive index and absorbance. This results in poor dispersion stability of the photo-curable ceramic slurry, limited penetration of incident light, and low curing layer thickness. Consequently, achieving high solid content in the photocured non-oxide ceramic slurry becomes difficult or even impossible. While surface oxidation of the powder has been employed to reduce the refractive index and minimize the difference between the non-oxide and photosensitive resin, as well as to weaken powder light absorption, enabling the photocuring of certain non-oxide powders, these approaches have limitations and are not universally applicable. Controlling the oxidation thickness is challenging, which in turn limits the curing thickness. Therefore, achieving high solid content in 3D printing of non-oxide ceramics remains a major challenge.

Compared to ultraviolet and visible light, near-infrared light offers advantages such as reduced light damage, lower light scattering, and greater penetration depth. In the system assisted by up-conversion materials for photopolymerization, the up-conversion particles can absorb multiple low-energy near-infrared photons and emit high-energy photons with shorter wavelengths in the ultraviolet, visible, and near-infrared range. This internal light source can initiate photochemical reactions at a close range. However, as the filler content increases, the extinction effects caused by refraction and scattering of near-infrared light also intensify, leading to a decrease in up-conversion luminescence and polymerization efficiency of the up-conversion particles. In the direction of incident light, the presence of fillers accelerates the attenuation of near-infrared light, resulting in reduced light penetration and curing depth compared to unfilled systems. However, non-oxide ceramic powders have the unique property of photothermal conversion under near-infrared light irradiation. The excited state electrons can relax from the excited state to the ground state through non-radiative emission, generating thermal energy.

Considering the application background and the current situation, there is an urgent need to develop a new method to address the challenge of curing high solid content non-oxide slurries.

SUMMARY OF THE INVENTION

In light of the aforementioned issues in the existing technology, the present invention introduces a near-infrared photothermal coupling curing non-oxide ceramic slurry, along with its preparation method and application. By combining photochemical and photothermal coupling mechanisms, the invention establishes a dual curing system based on up-conversion assisted polymerization. This approach maximizes the utilization of near-infrared light energy, enhances in-situ curing efficiency during the printing process, and results in improved material performance.

The technical scheme of the invention can be summarized as follows:

The primary objective of the invention is to provide a near-infrared photothermal coupling curing non-oxide ceramic slurry. The ceramic slurry comprises various raw materials, with each raw material having a specific weight.

40-90 parts of non-oxide ceramic powder
0.5-20 parts of photosensitive resin
1-40 parts of photosensitive monomer
0.25-4 parts of photoinitiator
0.25-4 parts of thermal initiator
0.75-5 parts of additives
0.5-4 parts of up-conversion luminescent material;

The non-oxide ceramic powders in the slurry can be selected from $Si_3N_4$, TiN, BN, AlN, SiC, WC, TiC, ZrC, $TiB_2$, and $ZrB_2$, either individually or in combination.

Preferably, the non-oxide ceramic powders are AlN, $Si_3N_4$, or SiC.

Furthermore, the morphology of the non-oxide ceramic powder can be spherical, rod-shaped, or flake-shaped. The particle size of the ceramic powder ranges from 1 nm to 300 μm.

In particular, a preferred option is to use spherical non-oxide ceramic powder with a particle size ranging from 100 nm to 50 μm.

As for the photosensitive resin, it can be one or more of the following: a resin containing an acrylate double bond, a resin containing a vinyl ether double bond, or a resin containing an epoxy group.

Preferably, the photosensitive resin is a mixture of one or more resins containing acrylate double bonds in any proportion.

Further preferably, the photosensitive resin is one or more of the photosensitive resin 6215-100 of Changxing Material Industry Co., Ltd. and the photosensitive resin CN996NS of Sadoma Company.

In one embodiment of the invention, the photosensitive monomer can be a bifunctional acrylate monomer or a multifunctional acrylate monomer.

Preferably, the photosensitive monomer can be one or more of the following: bis(trimethylolpropane) acrylate, 1,6-hexanediol diacrylate, trimethylolpropane triacrylate, neopentyl glycol diacrylate, dipentaerythritol hexaacrylate, pentaerythritol triacrylate, dipropylene glycol diacrylate, and pentaerythritol tetraacrylate.

In one embodiment of the invention, the photoinitiator can be a mixture of one or several compounds such as bis(2,6-difluoro-3-pyrrolylphenyl) titanocene, phenyl bis(2, 4,6-trimethylbenzoyl) phosphine oxide, 2-isopropylthioxanthone, camphorquinone, and [diethyl-(4-methoxybenzoyl) germanium]-(4-methoxyphenyl) methanone.

Preferably, the photoinitiator used is phenyl bis(2,4,6-trimethylbenzoyl) phosphine oxide.

In one embodiment of the invention, the thermal initiator can be an organic peroxide initiator, an azo initiator, an inorganic peroxide initiator, or a redox initiator.

Preferably, the thermal initiator can be one or more of benzoyl peroxide (BPO) and tert-butyl perbenzoate (TBPB).

In one embodiment of the invention, the auxiliary agent can be a defoaming agent, an anti-settling agent, or a rheological agent.

Preferably, the auxiliary agent can be one or more of BYK111, KOS110, and KH560.

In one embodiment of the invention, the up-conversion luminescent material can be $Yb^{3+}$ or $Tm^{3+}$ doped $NaYF_4$, $BaYF_5$, $LiYF_4$, or $NaYbF_4$. The doping amount of $Yb^{3+}$ can range from 0 to 30%, and the doping amount of $Tm^{3+}$ can range from 0.2 to 3.5%.

Preferably, the up-conversion materials used can be $NaYbF_4$ (with 0.5% $Tm^{3+}$ doping) and $\beta$-$NaYF_4$ (with 20% $Yb^{3+}$ doping and 0.5% $Tm^{3+}$ doping).

Furthermore, it is advantageous to optimize the particle size of the up-conversion material to be in the range of 500 nm to 401 μm.

The second objective of the invention is to provide a preparation method for the near-infrared photothermal coupling curing non-oxide ceramic slurry. The method comprises the following steps:

(Step 1) Disperse and mix 40 to 90 parts of non-oxide ceramic powder, 0.75 to 5 parts of additives, and 5 to 20 parts of anhydrous ethanol at high speed. Then, dry the mixture to remove the anhydrous ethanol and obtain modified non-oxide ceramic powder.

(Step 2) Obtain the photosensitive resin system by high-speed dispersion and mixing of 0.5 to 20 parts per hundred parts of resin (phr) of photosensitive resin, 1 to 40 phr of photosensitive monomer, 0.5 to 4 phr of up-conversion luminescent material, and 0.25 to 4 phr of photoinitiator.

(Step 3) Disperse and mix the modified non-oxide ceramic powder obtained from Step 1), 0.25 to 4 phr of thermal initiator, and the photosensitive resin system obtained from Step 2) at high speed. This process yields the near-infrared photothermal coupling curing non-oxide ceramic slurry.

(In Step 1), the optimal high-speed dispersion conditions were as follows: 2000-3500 rpm, 2-10 minutes.

For further optimization, the recommended high-speed dispersion conditions are: 2500-3000 rpm, 3-5 minutes.

Preferably, the drying conditions were: 45-90° C., 5-15 hours.

For further optimization, the recommended drying conditions are: 55-85° C., 7-10 hours.

(In Step 2), the high-speed dispersion conditions were preferably: 1000-3500 rpm, 2-10 minutes.

For further optimization, the recommended high-speed dispersion conditions are: 1500-3000 rpm, 3-5 minutes.

(In Step 3), the optimal high-speed dispersion conditions were as follows: 2000-3500 rpm, 2-10 minutes.

For further optimization, the recommended high-speed dispersion conditions are: 2500-3000 rpm, 3-5 minutes.

The surface of non-oxide ceramic powder particles is rich in hydroxyl groups, resulting in poor compatibility with photosensitive resin and monomer. To prepare a high solid content ceramic slurry, the non-oxide ceramic powder particles are first modified. The additives are added to react with the hydroxyl groups on the surface of non-oxide ceramic powder particles, greatly improving the stability and curing reactivity of the slurry, and reducing the printing time.

The third objective of the invention is to provide an application of the near-infrared photothermal coupling curing non-oxide ceramic slurry for the preparation of ceramic parts.

In one embodiment of the invention, the preparation method for the ceramic part is as follows:

(Step 1) The near-infrared photothermally coupled solidified non-oxide ceramic slurry is injected into a light-proof barrel of the printer, and any bubbles are removed through centrifugation.

(Step 2) The near-infrared photothermal coupling curing non-oxide ceramic slurry is printed using a near-infrared photo-assisted direct ink writing printer or a near-infrared photo-assisted stereolithography printer. The ceramic body is formed according to a pre-designed pattern.

(Step 3) The ceramic body is subjected to debinding and subsequent sintering processes to obtain the final ceramic part.

In one embodiment of the invention, in step 1), the centrifugal conditions are as follows: 3000-10000 r/min, 3-20 min;

preferably, the centrifugal conditions are: 5000-8000 r/min, 5-10 min.

In one embodiment of the invention, in step 2), the printing rate of the near-infrared photo-assisted direct ink writing printer is 0.5-70 mm/s, preferably 3-40 mm/s, and more preferably 5-25 mm/s.

The scanning speed of the near-infrared photo-assisted stereolithography printer is 1000-3000 mm/s, preferably 1500-2500 mm/s.

Preferably, the wavelength of the near-infrared light source is 780-2500 nm; more preferably, the wavelength of the near-infrared light source is 980 nm.

Preferably, the power of the near-infrared laser is 0.5-1200 $W/cm^2$, and further preferably, the power of the near-infrared laser is 50-600 $W/cm^2$.

Preferably, the debinding temperature is 500-750° C., and the debinding time is 60-180 min; further optimization, the debinding temperature is 550-700° C., and the time is 90-150 min.

Preferably, the heating rate to reach the debinding temperature is 0.5-1.5° C./min, and further preferably, the heating rate to reach the debinding temperature is 0.6-1.2° C./min.

Preferably, the sintering pressure is 0.15-0.7 MPa, the sintering temperature is 1200-1850° C., and the sintering time is 24-72 hours.

Further optimization includes a sintering pressure of 0.25-0.45 MPa, a temperature range of 1300-1800° C., and a sintering time of 30-65 hours.

The invention has the following beneficial technical effects:

The additives in the ceramic slurry prepared by the invention are closely bonded with the hydroxyl groups on the non-oxide ceramic powder particles, resulting in a ceramic slurry with long storage time, high solid content, low viscosity, high stability, and resistance to stratification and precipitation.

The invention combines the near-infrared up-conversion photochemical and photothermal dual curing system to address the issue of insufficient curing in single photocuring or thermal curing processes. Under near-infrared light irradiation, the up-conversion material emits ultraviolet light, inducing cross-linking and curing of the resin matrix at a short distance, enabling spatial and temporal control. The non-oxide ceramic material, through non-radiative emission and heat generated during the photocuring process, initiates a thermal polymerization reaction, rapidly and fully cross-linking the resin matrix. This allows for rapid curing of the non-oxide ceramic slurry.

The invention harnesses the photothermal conversion capability of non-oxide ceramic powder under near-infrared light, taking advantage of the superior light penetration of near-infrared long wavelengths. By integrating this with additive manufacturing driven by a near-infrared light source, the invention overcomes the challenge of in-situ curing during the printing process. This enables rapid prototyping of non-oxide ceramic slurry with a high solid content, ultimately resulting in the creation of high-fidelity non-oxide ceramic structures. Near-infrared up-conversion-assisted photocuring facilitates swift completion of the system, while thermal curing ensures thorough curing and drying of shadowed parts or inner layers. The coupling curing method enhances the overall performance of the printed structures.

DESCRIPTION OF THE PREFERRED EMBODIMENTS

The invention is described in detail in combination with the attached drawings and embodiments.

Embodiment 1

A preparation method for near-infrared photothermal coupling curing non-oxide ceramic slurry is provided. The method comprises the following steps:

(Step 1) Dispersing 62 parts per hundred parts of SiC powder (with an average particle size of 500 nm), 1.85 parts per hundred parts of BYK111, and 12.4 parts per hundred parts of anhydrous ethanol at a speed of 2400 r/min for 3 minutes. Subsequently, drying the mixture at 80° C. for 10 hours to remove the anhydrous ethanol, resulting in modified non-oxide ceramic powder.

(Step 2) Obtaining the photosensitive resin system by dispersing 10 parts of CN996NS photosensitive resin, 23 parts of DI-TMPTA photosensitive monomer, 1.5 parts of up-conversion particle β-NaYF$_4$ (with Yb$^{3+}$ doping amount of 20% and Tm$^{3+}$ doping amount of 0.5%), and 1 part of photoinitiator 819 at a speed of 1600 r/min for 4 minutes.

(Step 3) Dispersing the modified non-oxide ceramic powder obtained in step 1) (with a thermal initiator BPO content of 0.65 parts per hundred parts) and the photosensitive resin system obtained in step 2) at a speed of 2400 r/min for 4 minutes to obtain the near-infrared photothermal coupling curing non-oxide ceramic slurry.

Figure 1:
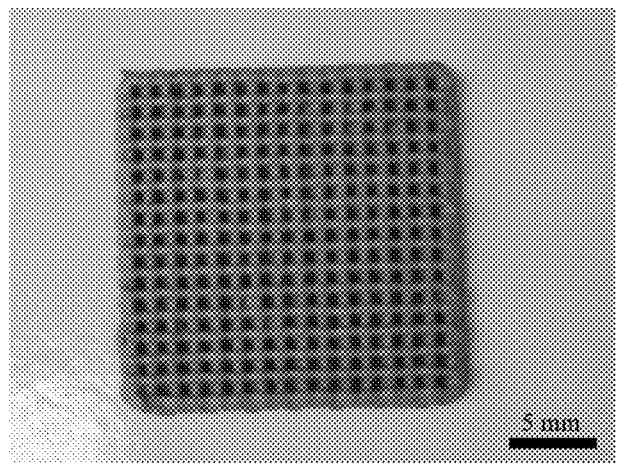
FIG. 1: Photograph of the grid structure body printed in Example 1

The near-infrared photothermal coupling curing non-oxide ceramic slurry prepared in this embodiment was introduced into the light-proof barrel of the printer, and centrifugation was carried out at 5000 r/min for 5 minutes to remove any bubbles. Subsequently, the near-infrared photothermal coupling solidified non-oxide ceramic slurry was printed using a near-infrared photo-assisted direct ink writing printer, with extrusion driven by gas. The extrusion nozzle moved at a speed of 20 mm/s, and a laser with a wavelength of 980 nm was used. The laser power was set to 100 W/cm$^2$, resulting in the formation of the grid ceramic body as shown in FIG. 1.

The obtained ceramic body underwent a debinding and sintering process. The debinding was performed at a temperature of 650° C., with a heating rate of 0.1° C./min, and a debinding time of 2 hours. The sintering process was conducted at a pressure of 0.4 MPa, a sintering temperature of 1450° C., a heating rate of 1° C./min, and a sintering time of 55 hours. As a result, the ceramic parts were successfully obtained.

Embodiment 2

A preparation method for near-infrared photothermal coupling curing non-oxide ceramic slurry is provided, comprising the following steps:

(Step 1) 70 parts by weight of SiC powder (average particle size of 500 nm), 2.1 parts by weight of BYK111, and 14 parts by weight of anhydrous ethanol were dispersed at 2500 r/min for 3 minutes. Subsequently, the mixture was dried at 80° C. for 8 hours to remove the anhydrous ethanol, resulting in the modified non-oxide ceramic powder.

(Step 2) The photosensitive resin system was obtained by dispersing 10 parts of photosensitive resin 6215-100, 15.15 parts of photosensitive monomer DI-TMPTA, 1.5 parts of up-conversion particles β-NaYF$_4$ (with Yb$^{3+}$ doping amount of 20% and Tm$^{3+}$ doping amount of 0.5%), and 0.75 parts of photoinitiator 819 at 1600 r/min for 4 minutes.

(Step 3) The modified non-oxide ceramic powder obtained in Step 1), 0.50 parts by weight of thermal initiator BPO, and the photosensitive resin system obtained in Step 2) were dispersed at 2500 r/min for 4 minutes to obtain the near-infrared photothermal coupling curing non-oxide ceramic slurry.

Figure 2:
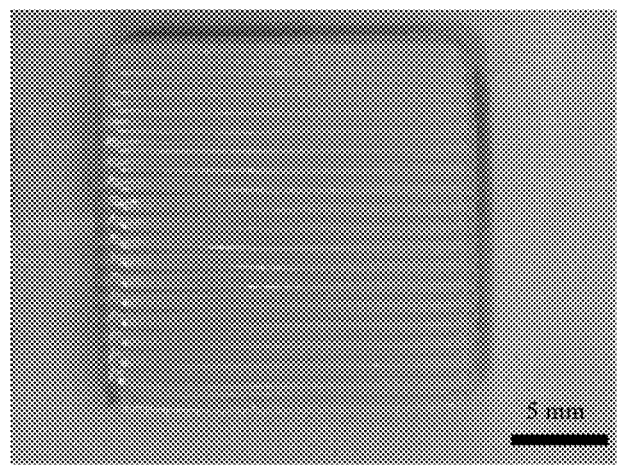
FIG. 2: Photograph of the block structure body printed in Example 2 of the implementation

The near-infrared photothermal coupling curing non-oxide ceramic slurry prepared in this embodiment was injected into the light-proof barrel of the printer, and the bubbles were removed by centrifugation at 6000 r/min for 7 minutes. Subsequently, the near-infrared light-thermal coupling curing non-oxide ceramic slurry was printed on the near-infrared photo-assisted direct ink writing printer, with extrusion driven by gas. The extrusion nozzle moved at a speed of 10 mm/s, while the laser had a wavelength of 980 nm and a power of 150 W/cm$^2$. The result was the square ceramic body shown in FIG. 2.

The obtained ceramic body underwent debinding and sintering. The debinding temperature was set at 650° C., with a heating rate of 0.1° C./min, and the debinding process lasted for 2 hours. For sintering, a pressure of 0.4 MPa was applied, with a sintering temperature of 1450° C. The heating rate during sintering was 1° C./min, and the sintering time was 55 hours. As a result, ceramic parts were successfully obtained.

Embodiment 3

A preparation method for near-infrared photothermal coupling curing non-oxide ceramic slurry is provided. The method includes the following steps:

(Step 1) Disperse 81 parts per hundred parts of SiC powder (average particle size of 12500 nm), 2.43 parts per hundred parts of BYK111, and 16.2 parts per hundred parts of anhydrous ethanol at 2700 r/min for 3 minutes. Then, dry the mixture at 80° C. for 8 hours to remove the anhydrous ethanol, obtaining modified non-oxide ceramic powder.

(Step 2) Disperse 1 part per hundred parts of photosensitive resin CN996NS, 13.54 parts per hundred parts of photosensitive monomer DI-TMPTA, 1.3 parts per hundred parts of up-conversion particle $NaYbF_4$ (with $Tm^{3+}$ doping amount of 0.5%), and 0.44 parts per hundred parts of photoinitiator 819 at 1600 r/min for 4 minutes to obtain the photosensitive resin system.

(Step 3) Disperse the modified non-oxide ceramic powder obtained in Step 1), 0.29 parts per hundred parts of thermal initiator BPO, and the photosensitive resin system obtained in Step 2) at 2700 r/min for 4 minutes, resulting in the near-infrared photothermal coupling curing non-oxide ceramic slurry.

The near-infrared photothermal coupling curing non-oxide ceramic slurry prepared using this method was loaded into a light-proof barrel of the printer, and the bubbles were eliminated by centrifugation at a speed of 7500 r/min for 8 minutes. Subsequently, the slurry was printed using a near-infrared photo-assisted direct ink writing printer, with gas-driven extrusion. The extrusion nozzle moved at a speed of 5 mm/s, while the laser operated at a wavelength of 980 nm with a power of 200 $W/cm^2$, resulting in the formation of a ceramic body.

The obtained ceramic body underwent sequential debinding and sintering processes. The debinding temperature was set at 650° C., and the temperature increased at a rate of 0.2° C./min. The debinding process lasted for 2 hours. For sintering, a pressure of 0.4 MPa was applied, and the sintering temperature reached 1450° C. at a heating rate of 1° C./min. The sintering duration was 55 hours, leading to the production of ceramic parts.

Embodiment 4

A method for preparing near-infrared photothermal coupling curing non-oxide ceramic slurry is provided. The method includes the following steps:

(Step 1) Disperse 75 parts by weight (phr) of $Si_3N_4$ powder with an average particle size of 500 nm, 2.25 phr of KH560, and 15 phr of anhydrous ethanol at a speed of 2600 r/min for 3 minutes. Then, dry the mixture at 80° C. for 8 hours to remove the anhydrous ethanol and obtain modified non-oxide ceramic powder.

(Step 2) Disperse 5 portions of photosensitive resin 6215-100, 15.35 portions of photosensitive monomer TMPTA, 1.4 portions of up-conversion particles $NaYbF_4$ (with $Tm^{3+}$ doping amount of 0.5%), and 0.60 portions of photoinitiator 819 from Changxing Materials Industry Co., Ltd. at a speed of 1600 r/min for 4 minutes to obtain the photosensitive resin system.

(Step 3) Disperse the modified non-oxide ceramic powder obtained in Step 1), 0.40 phr of thermal initiator TBPB, and the photosensitive resin system obtained in Step 2) at a speed of 2600 r/min for 4 minutes to obtain the near-infrared photothermal coupling curing non-oxide ceramic slurry.

The near-infrared photothermal coupling curing non-oxide ceramic slurry prepared in this embodiment was injected into the light-proof barrel of the printer, and the bubbles were removed by centrifugation at 7000 r/min for 7 minutes. Subsequently, the near-infrared photothermal coupling curing non-oxide ceramic slurry was printed using a near-infrared photo-assisted direct ink writing printer, with extrusion driven by gas. The extrusion nozzle moved at a speed of 8 mm/s, and the laser had a wavelength of 980 nm. The laser power was set at 150 $W/cm^2$, resulting in the fabrication of a ceramic body.

The obtained ceramic body was subjected to a debinding and sintering process. The debinding temperature was set at 650° C., and the heating rate to reach this temperature was 0.3° C./min. The debinding process lasted for 3 hours. Subsequently, the ceramic body was subjected to a sintering process under a pressure of 0.15 MPa. The sintering temperature was set at 1750° C., and the heating rate to reach this temperature was 0.60° C./min. The sintering process lasted for 30 hours, resulting in the production of ceramic parts.

Embodiment 5

The near-infrared photothermal coupling curing non-oxide ceramic slurry is prepared using the following method:

(Step 1) Disperse 65 parts of SiC powder (average particle size of 500 nm), 1.9 parts of BYK111, and 13.0 parts of anhydrous ethanol at 2500 r/min for 3 minutes. Then, dry the mixture at 80° C. for 10 hours to remove the anhydrous ethanol and obtain modified non-oxide ceramic powder.

(Step 2) Disperse 3 parts of photosensitive resin CN996NS, 27 parts of photosensitive monomer TMPTA, 1.6 parts of up-conversion particle $\beta$-$NaYF_4$ (with $Yb^{3+}$ doping amount of 20% and $Tm^{3+}$ doping amount of 0.5%), and 0.9 parts of photoinitiator 819 at 1800 r/min for 4 minutes to obtain the photosensitive resin system.

(Step 3) Disperse the modified non-oxide ceramic powder obtained in step 1), 0.6 parts of thermal initiator BPO, and the photosensitive resin system obtained in step 2) at 2500 r/min for 4 minutes to obtain the near-infrared photothermal coupling curing non-oxide ceramic slurry.

The near-infrared photothermal coupling curing non-oxide ceramic slurry prepared using this method was utilized as follows. First, the slurry was injected into the light-proof barrel of a printer, and any bubbles present were removed through centrifugation at a speed of 5000 r/min for 5 minutes. Subsequently, the near-infrared light-thermal coupling curing non-oxide ceramic slurry was printed on a near-infrared photo-assisted stereolithography printer. The laser scanning speed during printing was set to 2000 mm/s, the laser wavelength was 980 nm, and the laser power was 80 $W/cm^2$. This process resulted in the fabrication of a ceramic body with desired characteristics.

The obtained ceramic body then underwent debinding and sintering in sequential steps. Debinding was conducted at a temperature of 650° C., with a heating rate of 0.1° C./min and a duration of 2 hours. Subsequently, the ceramic body was subjected to sintering under a pressure of 0.4 MPa, at a temperature of 1450° C., with a heating rate of 1° C./min, and a sintering time of 55 hours. Through these processes, the desired ceramic parts were obtained.

Embodiment 6

The near-infrared photothermal coupling curing non-oxide ceramic slurry can be prepared using the following steps:

(Step 1) Disperse 70 parts by weight of $Si_3N_4$ powder (average particle size of 500 nm), 2.40 parts of KH560, and 16 parts of anhydrous ethanol at a speed of 2800 r/min for 4 minutes. Then, dry the mixture at 80° C. for 7 hours to remove the anhydrous ethanol and obtain modified non-oxide ceramic powder.

(Step 2) Disperse 5 parts of photosensitive resin 6215-100, 20.35 parts of photosensitive monomer TMPTA, 1.3 parts of up-conversion particles $NaYbF_4$ ($Tm^{3+}$ doping amount of 0.5%), and 0.55 parts of photoinitiator 819 from Changxing Materials Industry Co., Ltd. at a speed of 1900 r/min for 4 minutes to obtain the photosensitive resin system.

(Step 3) Disperse the modified non-oxide ceramic powder obtained in step 1), 0.40 parts of thermal initiator TBPB, and the photosensitive resin system obtained in step 2) at a speed of 2800 r/min for 4 minutes to obtain the near-infrared photothermal coupling curing non-oxide ceramic slurry.

The near-infrared photothermal coupling curing non-oxide ceramic slurry prepared according to this embodiment was injected into the light-proof barrel of the printer, and the bubbles were removed by centrifugation at a speed of 7000 r/min for 7 minutes. Subsequently, the near-infrared light-thermal coupling curing non-oxide ceramic slurry was printed using a near-infrared photo-assisted stereolithography printer. The laser scanning speed was set to 2200 mm/s, the laser wavelength was 980 nm, and the laser power was 90 W/cm², resulting in the fabrication of the ceramic body.

The obtained ceramic body was subjected to debinding and sintering processes. The debinding temperature was maintained at 650° C. with a heating rate of 0.3° C./min, and the debinding process lasted for 3 hours. The sintering process was conducted under a pressure of 0.15 MPa, at a sintering temperature of 1750° C. with a heating rate of 0.60° C./min, and the sintering time was set to 30 hours. Through these steps, the final ceramic parts were successfully obtained.

Comparative Embodiment 1

A method for preparing near-infrared photothermal coupling curing non-oxide ceramic slurry is described. The method comprises the following steps:

(Step 1) Disperse 62 parts per hundred parts of SiC powder (with an average particle size of 500 nm), 1.85 parts per hundred parts of BYK111, and 12.4 parts per hundred parts of anhydrous ethanol at a speed of 2400 r/min for 3 minutes. Then, dry the mixture at 80° C. for 10 hours to remove the anhydrous ethanol, resulting in modified non-oxide ceramic powder.

(Step 2) Disperse 10 parts of photosensitive resin CN996NS, 23.65 parts of photosensitive monomer DI-TMPTA, 1.5 parts of up-conversion particles $\beta$-$NaYF_4$ (with $Yb^{3+}$ doping amount of 20% and $Tm^{3+}$ doping amount of 0.5%), and 1 part of photoinitiator 819 at a speed of 1600 r/min for 4 minutes to obtain the photosensitive resin system.

(Step 3) Disperse the modified non-oxide ceramic powder obtained in Step 1) and the photosensitive resin system obtained in Step 2) at a speed of 2400 r/min for 4 minutes to obtain the near-infrared light-cured non-oxide ceramic slurry.

The near-infrared light-cured non-oxide ceramic slurry prepared according to this embodiment was used for printing purposes. After removing the bubbles through centrifugation at 5000 r/min for 5 minutes, the near-infrared photothermal coupling solidified non-oxide ceramic slurry was printed using a near-infrared photo-assisted direct ink writing printer. The extrusion was driven by gas, with the extrusion nozzle moving at a speed of 20 mm/s. The laser used had a wavelength of 980 nm, and the laser power was set at 100 W/cm². The resulting product was a ceramic body.

To further process the ceramic body, it underwent a debinding and sintering process. The debinding temperature was set at 650° C., with a heating rate of 0.1° C./min. The debinding time was 2 hours. However, due to incomplete curing prior to heat treatment, cracking occurred during the debinding process.

Comparative Embodiment 2

A method for preparing a near-infrared photothermal coupling curing non-oxide ceramic slurry is described, involving the following steps:

(Step 1) Disperse 70 parts per hundred parts of SiC powder (with an average particle size of 500 nm), 2.1 parts per hundred parts of BYK111, and 14 parts per hundred parts of anhydrous ethanol at a speed of 2500 r/min for 3 minutes. Then, dry the mixture at 80° C. for 8 hours to remove the anhydrous ethanol and obtain modified non-oxide ceramic powder.

(Step 2) Disperse 10 portions of photosensitive resin 6215-100 from Changxing Materials Industry Co., Ltd., 15.9 portions of photosensitive monomer DI-TMPTA, and 1.5 portions of up-conversion particles $\beta$-$NaYF_4$ (with $Yb^{3+}$ doping amount of 20% and $Tm^{3+}$ doping amount of 0.5%) at a speed of 1600 r/min for 4 minutes to obtain the resin system.

(Step 3) Disperse the modified non-oxide ceramic powder obtained in step 1), 0.50 parts per hundred parts of thermal initiator BPO, and the photosensitive resin system obtained in step 2) at a speed of 2500 r/min for 4 minutes to obtain the near-infrared thermal curing non-oxide ceramic slurry.

The near-infrared thermosetting non-oxide ceramic slurry prepared in this embodiment was injected into the light-proof barrel of the printer, and the bubbles were removed by centrifugation at 6000 r/min for 7 minutes. Subsequently, the near-infrared photothermal coupling solidified non-oxide ceramic slurry was printed using a near-infrared photo-assisted direct ink writing printer with gas-driven extrusion. The extrusion nozzle moved at a speed of 10 mm/s, and the laser wavelength used was 980 nm. A laser power of 150 W/cm² was applied to obtain a ceramic body.

The obtained ceramic body underwent debinding and sintering sequentially. The debinding process involved heating the ceramic body to a temperature of 650° C., with a heating rate of 0.1° C./min, and maintaining this temperature for 2 hours. However, due to incomplete curing before heat treatment, cracking occurred during the debinding process.

Comparative Embodiment 3

A preparation method of near-infrared photothermal coupling curing non-oxide ceramic slurry is described. The method comprises the following steps:

(Step 1) 90.5 phr SiC powder with an average particle size of 12500 nm, 2.43 phr BYK111, and 18.1 phr anhydrous ethanol were dispersed at 3000 r/min for 4 minutes. The dispersion was then dried at 80° C. for 8 hours to remove the anhydrous ethanol and obtain modified non-oxide ceramic powder.

(Step 2) The photosensitive resin system was obtained by dispersing 0.5 phr of photosensitive resin CN996NS, 3.3 phr of photosensitive monomer HDDA, 2 phr of photosensitive monomer DI-TMPTA, 1 phr of up-conversion particle NaYbF$_4$ (with a Tm$^{3+}$ doping amount of 0.5%), and 0.17 phr of photoinitiator 784. The dispersion was carried out at 1600 r/min for 4 minutes.

(Step 3) The modified non-oxide ceramic powder obtained from step 1), 0.10 phr thermal initiator BPO, and the photosensitive resin system obtained from step 2) were dispersed for 5 minutes at a speed of 3000 r/min to obtain the near-infrared photothermal coupling curing non-oxide ceramic slurry.

The near-infrared photothermal coupling curing non-oxide ceramic slurry prepared using this method was injected into the light-proof barrel of the printer, and the bubbles were removed by centrifugation at 9000 r/min for 8 minutes. Subsequently, the slurry was printed on a near-infrared photo-assisted direct ink writing printer with extrusion driven by gas. The laser used had a wavelength of 980 nm, and the laser power was set to 200 W/cm$^2$. However, due to the high viscosity of the slurry, extrusion became challenging.

Comparative Embodiment 4

A method for preparing near-infrared photothermal coupling curing non-oxide ceramic slurry is provided. The method includes the following steps:

(Step 1) Disperse 75 parts per hundred parts of Si$_3$N$_4$ powder (average particle size of 500 nm), 2.25 parts per hundred parts of KH560, and 15 parts per hundred parts of anhydrous ethanol at a speed of 2600 r/min for 3 minutes. Then, dry the mixture at 80° C. for 8 hours to remove the anhydrous ethanol and obtain modified non-oxide ceramic powder.

(Step 2) Disperse 5 portions of photosensitive resin 6215-100, 16.75 portions of photosensitive monomer TMPTA, and 0.60 portions of photoinitiator 819 from Changxing Material Industry Co., Ltd. at a speed of 1600 r/min for 4 minutes to obtain the photosensitive resin system.

(Step 3) Disperse the modified non-oxide ceramic powder obtained from step 1), 0.40 parts per hundred parts of thermal initiator TBPB, and the photosensitive resin system obtained from step 2) at a speed of 2600 r/min for 4 minutes to obtain the near-infrared photothermal coupling curing non-oxide ceramic slurry.

The near-infrared photothermal coupling curing non-oxide ceramic slurry prepared by this embodiment was injected into the light-proof barrel of the printer, and the bubbles were removed by centrifugation at 7000 r/min for 7 minutes. Subsequently, the slurry was printed on a near-infrared photo-assisted direct ink writing printer using gas extrusion. The extrusion nozzle moved at a speed of 8 mm/s, and a laser with a wavelength of 980 nm and a power of 150 W/cm$^2$ was used. However, it was not possible to achieve the desired ceramic body with in-situ shape preservation.

Testing Embodiment

The implementation examples were tested using rheological tests, slurry curing performance tests, and mechanical property tests, and the properties of the ceramic slurry and ceramic prepared in proportion are presented in Table 1. The testing standards and methods are described as follows:

(1). Viscosity test: The viscosity of the slurry was measured using a viscometer at a shear rate of 30 rad/s. This measurement provides an indication of the flow behavior of the slurry.

Figure 3:
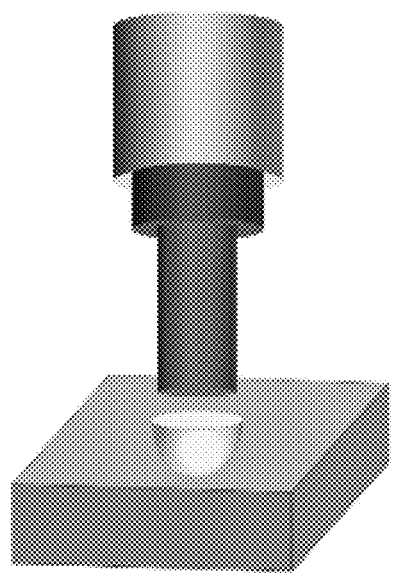
FIG. 3: Diagram showing the test results of slurry curing thickness

(2). Slurry curing performance test: The ceramic slurry was placed in a test tank and irradiated with near-infrared light of a specific intensity. After a certain period of time, the solidified sample was obtained. The uncured slurry was then washed with anhydrous ethanol. The thickness of the solidified sample was measured using a vernier caliper. Each group of samples was repeated five times to obtain an average thickness. In this test, a near-infrared light intensity of 150 W/cm$^2$ was used, and the curing time was set to 3 seconds. The schematic diagram of the slurry curing thickness test is shown in FIG. 3.

(3). Three-point bending strength test: The three-point bending strength of the ceramic sample was tested using a universal testing machine according to the standard GB/T 6569-2006 fine ceramic bending strength test method. This test evaluates the mechanical strength of the ceramic material.

TABLE 1

| | Viscosity of ceramic slurry Viscosity, Pa · s (30 rad/s) | Curing performance of ceramic slurry Curing thickness, μm (Near infrared light intensity 150 W/cm$^2$, curing time 3 seconds) | Ceramic properties three-point bending strength (Mpa) |
|---|---|---|---|
| Embodiment 1 | 16.4 | 1376 | 414.5 |
| Embodiment 2 | 28.6 | 1264 | 420.4 |
| Embodiment 3 | 45.8 | 1481 | 423.6 |
| Embodiment 4 | 40.3 | 965 | 491.1 |
| Embodiment 5 | 14.6 | 1168 | 441.2 |
| Embodiment 6 | 19.4 | 1046 | 504.3 |
| Comparative embodiment 1 | 15.8 | 223 | It was not completely cured before heat treatment, and cracking occurred during debinding. |
| Comparative embodiment 2 | 27.5 | 627 | It was not completely cured before heat treatment, and cracking occurred during debinding. |
| Comparative embodiment 3 | 163.2 | — | — |
| Comparative embodiment 4 | 39.6 | 125 | Failed to in situ curing molding |

The above is only the preferred implementation method of the invention. It should be pointed out that for ordinary technicians in the technical field, some improvements and embellishments can be made without breaking away from the principle of the invention. These improvements and embellishments should also be regarded as the scope of protection of the invention.

What is claimed is:

1. The near-infrared photothermal coupling curing non-oxide ceramic slurry is composed of various raw materials with different weights, including:
    40-90 parts of non-oxide ceramic powders;
    0.5-20 parts of a photosensitive resin;
    1-40 parts of a photosensitive monomer;
    0.25-4 parts of a photoinitiator;
    0.25-4 parts of a thermal initiator;
    0.75-5 parts of additives; and
    0.5-4 parts of up-conversion luminescent materials;
    wherein the non-oxide ceramic powders include one or more of $Si_3N_4$, TiN, BN, AlN, SiC, WC, TiC, ZrC, $TiB_2$, and $ZrB_2$,
    wherein the up-conversion luminescent materials include one or more of $Yb^{3+}$ or $Tm^{3+}$ doped $NaYF_4$, $BaYF_5$, $LiYF_4$, and $NaYbF_4$, and
    wherein a doping amount of $Yb^{3+}$ ranges from 0% to 30%, and a doping amount of $Tm^{3+}$ ranges from 0.2% to 3.5%.

2. The near-infrared photothermal coupling curing non-oxide ceramic slurry of claim 1, wherein the photosensitive resin is one or more of resins containing acrylate double bonds, vinyl ether double bonds, or epoxy groups.

3. The near-infrared photothermal coupling curing non-oxide ceramic slurry of claim 1, wherein the photosensitive monomer is one or more of bifunctional acrylate monomers and multi-functional acrylate monomers.

4. The near-infrared photothermal coupling curing non-oxide ceramic slurry of claim 1, wherein the photoinitiator is one or more of bis(2,6-difluoro-3-pyrrolylphenyl) titanocene, phenyl bis(2,4,6-trimethylbenzoyl) phosphine oxide, 2-isopropylthioxanthone, camphorquinone, or [diethyl-(4-methoxybenzoyl) germanium]-(4-methoxyphenyl) methanone.

5. The near-infrared photothermal coupling curing non-oxide ceramic slurry of claim 1, wherein the thermal initiator is one or more of organic peroxide initiators, azo initiators, inorganic peroxide initiators, or redox initiators.

6. The near-infrared photothermal coupling curing non-oxide ceramic slurry of claim 1, wherein the additives are one or more of defoamers, anti-settling agents, and rheological agents.

7. A preparation method of the near-infrared photothermal coupling curing non-oxide ceramic slurry of claim 1 comprising the following steps:
    step 1) dispersing and mixing 40-90 parts of the non-oxide ceramic powder, 0.75-5 parts of the additives, and 5-20 parts of anhydrous ethanol at high speed, and then removing the anhydrous ethanol through drying to obtain a modified non-oxide ceramic powder;
    step 2) obtaining a photosensitive resin system by high-speed dispersion and mixing of 0.5-20 parts of the photosensitive resin, 1-40 parts of the photosensitive monomer, 0.5-4 parts of the up-conversion luminescent materials, and 0.25-4 parts of the photoinitiator; and
    step 3) dispersing and mixing the modified non-oxide ceramic powder obtained in step 1), 0.25-4 parts of the thermal initiator, and the photosensitive resin system obtained in step 2) at high speed to obtain the near-infrared photothermal coupling curing non-oxide ceramic slurry.

8. An application of the near-infrared photothermal coupling curing non-oxide ceramic slurry of claim 1 in a preparation method of ceramic parts, the preparation method of the ceramic parts comprising:
    step 1) injecting the near-infrared photothermal coupling curing non-oxide ceramic slurry into a light-proof barrel of a printer, and removing bubbles through centrifugation;
    step 2) printing the near-infrared photothermal coupling curing non-oxide ceramic slurry by using a near-infrared photo-assisted direct ink writing printer or a near-infrared photo-assisted stereolithography printer, and forming a ceramic body according to a pre-designed pattern; and
    step 3) debinding and sintering the ceramic body to obtain the ceramic parts.

* * * * *